(No Model.)
C. C. JEROME.
PISTON ROD PACKING.
No. 418,518. Patented Dec. 31, 1889.
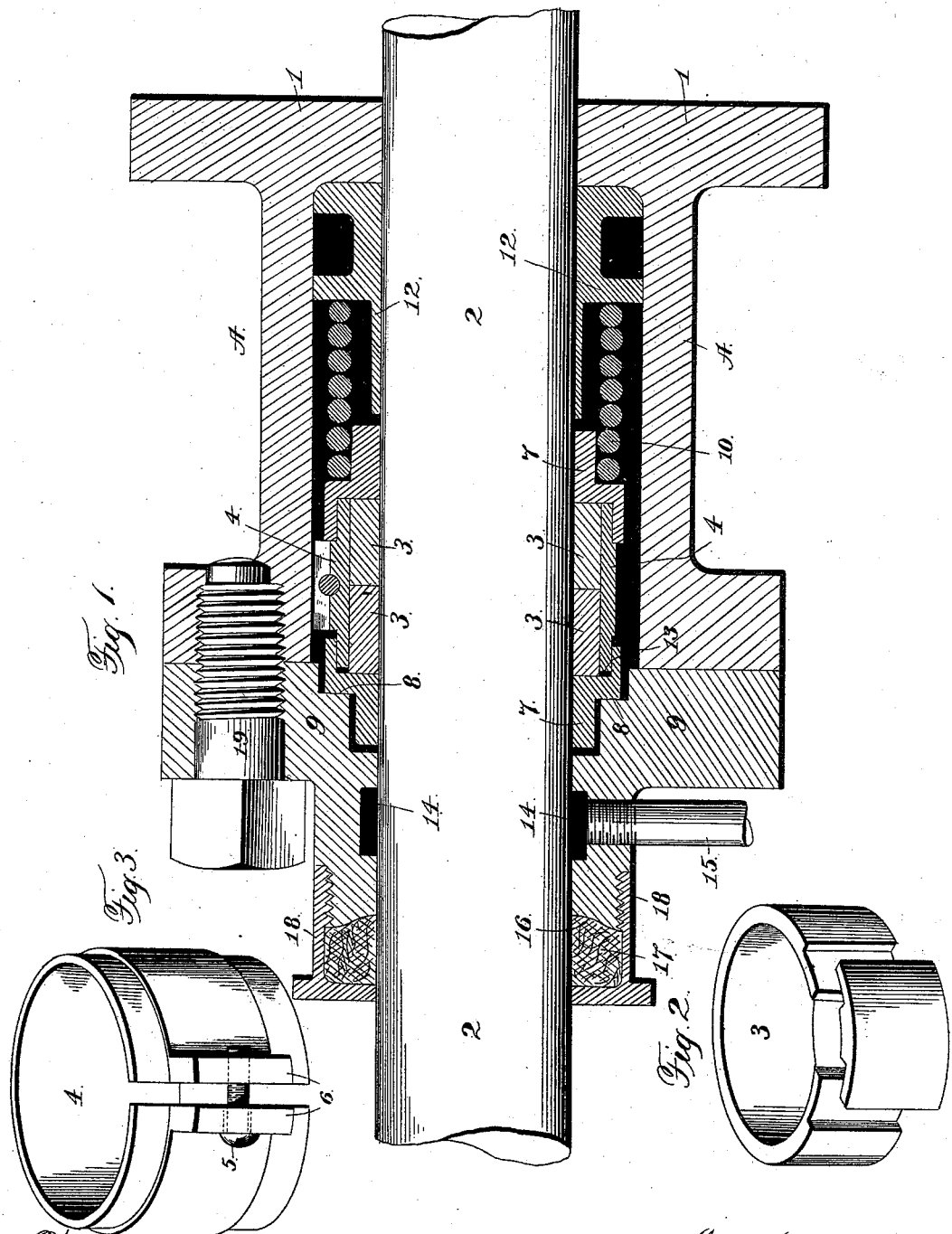

UNITED STATES PATENT OFFICE.

CHARLES C. JEROME, OF CHICAGO, ILLINOIS.

PISTON-ROD PACKING.

SPECIFICATION forming part of Letters Patent No. 418,518, dated December 31, 1889.

Application filed August 27, 1889. Serial No. 322,106. (No model.)

*To all whom it may concern:*

Be it known that I, CHARLES C. JEROME, a citizen of Chicago, in the county of Cook and State of Illinois, have invented certain new and useful Improvements in Piston-Rod Packing; and I do hereby declare the following to be a full, clear, and exact description of the invention, such as will enable others skilled in the art to which it appertains to make and use the same.

My invention relates to an improvement in metallic piston-rod packings, the object being to provide a steam-setting packing which is purely automatic, packing the rod only when the engine is using steam and entirely relieving it from all pressure or friction when the steam is shut off.

A further object is to provide a simple packing comprising few parts so arranged that the wear upon the piston-rod will be very slight and friction will be reduced to a minimum.

With these ends in view my invention consists in certain novel features of construction and combinations of parts, as will be hereinafter described, and pointed out in the claims.

In the accompanying drawings, Figure 1 is a longitudinal section through the stuffing-box and packing, the piston-rod being in elevation. Fig. 2 is a view of one of the packing-rings, and Fig. 3 is a view of the expanding-band.

A represents an ordinary stuffing-box formed on one head 1 of a steam-cylinder, and 2 is the piston-rod, which reciprocates through the stuffing-box. The packing is composed of a pair of sectional rings 3 3. The two rings are companion rings and exact counterparts of each other, both being cast, preferably, in the same mold. They may be made, as shown in Fig. 2, in two interlocking sections, which when together give the appearance of a single ring; or they may be made in two separate halves, which would be easier to apply, as the engine would not have to be disconnected if the rings were made this way. These rings are of some soft metal and are surrounded by a hard-brass band 4, the tendency of which is to constantly spring outward or away from the rings, but which is counteracted, or at least controlled, by a set-screw 5, passing through the outwardly-projecting lugs 6 6. With the parts as shown the band 4 could not expand to any great extent; but as the soft-metal rings 3 3 wear room is made for the expansion of the band. It is not always desirable to permit the band to expand until it strikes the flanges of the cups, because sufficient space for the ends of the sections of the rings to overlap would be formed. To prevent such expansion the screw is provided. By having the cup project out beyond the band the latter is prevented from lateral displacement, and by covering the joint between the rings with the band and leaving the greater part of the outer surface of the latter exposed to the steam ingress of steam between the rings is prevented and the band exposed to the steam, so that it is acted upon immediately. The screw extends loosely through one lug, so that the band is free to be contracted by the impact of steam or to resume its normal position by virtue of its own elasticity. By screwing down the band around the rings they are brought to a steam-tight joint around the rod and held in close contact with the rod while the engine is using steam. From the pressure of the steam around the outside of the band 4, and from the fact that the inclination of the band is to expand, when the steam is shut off the band at once springs outward away from the rings as far as allowed to by the set-screw. This immediately relieves all pressure upon the piston-rod, and consequently all wear and friction when the steam is not on.

The rings and band are retained in position within the stuffing-box by means of the cups 7 7. One of these cups is ground to a steam-tight joint at 8, where it has contact with the gland 9, and a steam-tight joint is made between the ends of the rings and their seat in the cups by means of the stiff spiral spring 10. The rear cup, it will be observed, acts as a follower against which the spring rests to force the rings 3 3 in contact with each other, besides holding the other parts yieldingly together.

The bushing 12 is located in the inner end of the stuffing-box, and is made to extend under the spring 10 and forward, so as to nearly come in contact with the adjacent cup 7, which in case of a backward movement of the ring, due to sticking to the rod, furnishes a rigid resistance, releasing it from the rod, so that the spring immediately forces it back into place.

It will be observed that the band 4 is slightly narrower than the rings 3 3, thus allowing them to protrude slightly beyond the band to form a joint with the adjacent cup 7 at point 13.

The gland is furnished with the usual annular recess 14, into which the products of condensation collect, and a small pipe 15 conducts it off. A chamber 16 is formed in the outer end of the gland, and a textile packing 17 is held therein by the screw-cap 18. The gland itself is held in place by screw-bolts or rivets 19, as the case may be.

To one familiar with packings of this character it is well known that the wear on the valve-rod is very uneven, and that packing which will not automatically accommodate itself to this irregularity in the surface of the rod soon becomes inoperative, as the rod always wears more in the center than it does at either end. Consequently, when the packing is close around the small portions of the rod and held there by spring-pressure, as is often the case in packing in general use, it is impossible for it to give or open to allow the larger portions to pass through the packing when the engine is given full-stroke; but in this case the packing is always free to open or expand to its original size, and will open and close over uneven surfaces as readily as it would on a smooth surface, and actual experiment has proven this principle absolutely correct.

Having fully described my invention, what I claim as new, and desire to secure by Letters Patent, is—

1. The combination, with a stuffing-box and a piston-rod, of a series of sectional soft-metal packing-rings arranged to break joints, an expansible steam-setting band embracing the series of packing-rings, a screw attached to one end of said band and loosely passing through the other end for limiting the expansion of said band, and cups forming tight joints with the packing-rings, substantially as set forth.

2. The combination, with a stuffing-box and piston-rod, of a pair of soft-metal sectional packing-rings arranged side by side to break joints, an expansible steam-setting band slightly narrower than the combined thickness of the packing-rings, and the cups forming tight joints with the rings and overlapping the side edges of the band, the central portion of said band being exposed to the steam, substantially as set forth.

3. The combination, with a stuffing-box, a gland having a condensing-recess therein, a drip-pipe, and packing, of a pair of sectional soft-metal packing-rings, an expansible band covering the greater portion of the exposed surface of the packing-rings, cups having tight joints with the rings and overlapping the edges of the band, a bushing, and a spring located between and bearing against the bushing and adjacent cup, substantially as set forth.

In testimony whereof I have signed this specification in the presence of two subscribing witnesses.

CHARLES C. JEROME.

Witnesses:
GEO. A. WHEELER, Jr.,
HENRY R. SMITH.